Dec. 17, 1957    F. C. CROWE ET AL    2,816,387
FISHING INDICATOR AND SWITCH THEREFOR
Filed Sept. 21, 1954
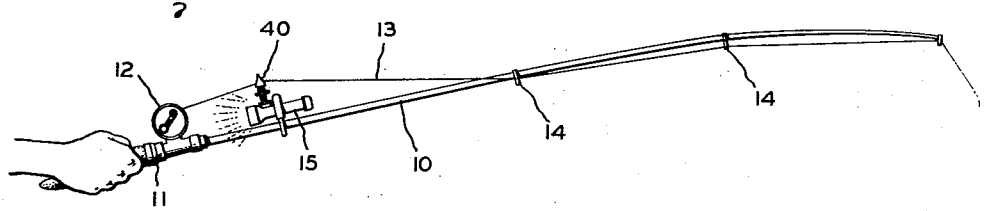
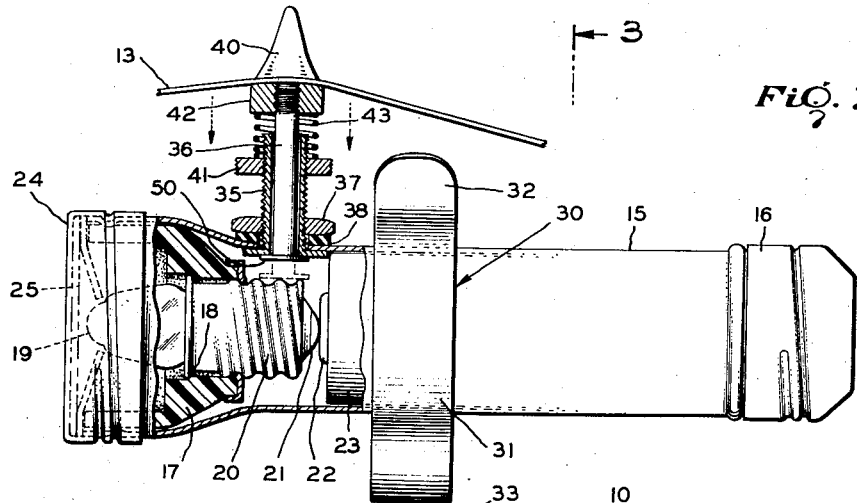
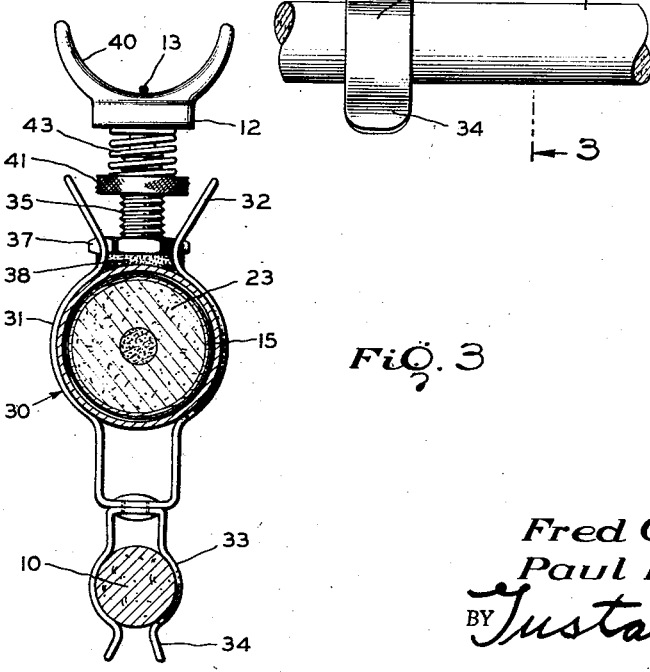
INVENTORS
Fred C. Crowe.
Paul F. Strobel
BY
ATTORNEY

United States Patent Office 2,816,387
Patented Dec. 17, 1957

2,816,387
FISHING INDICATOR AND SWITCH THEREFOR

Fred C. Crowe and Paul F. Strobel, Dayton, Ohio

Application September 21, 1954, Serial No. 457,476

1 Claim. (Cl. 43—17)

This invention relates to an indicator for fishing, and has as its primary object the provision of a visual or audible signal whereby a bite at the end of a fishing line may be detected either by day or night.

An additional object of the invention is the provision of a highly sensitive switch which may be readily adjusted to varying conditions of current, wind and temperature as desired, in order that the indication of a bite at the end of a fishing line may be readily detected.

Still another object of the invention is the provision of a means whereby variations in wind and current will not be transmitted directly to the switch, but will rather be disseminated in such a manner that the switch will respond to activate the signal only under predetermined conditions.

Still another object of the invention resides in the provision of such a switch which may be readily adjusted with a minimum of effort and difficulty.

Still other objects reside in the combinations of elements, arrangements of parts and features of construction, all as will be more fully pointed out hereinafter and disclosed in the accompanying drawing, wherein there is shown a preferred embodiment of this inventive concept.

In the drawings:

Figure 1 is a side elevational view of a fishing rod showing the device of the instant invention attached thereto.

Figure 2 is an enlarged side view, partially in section and partially in elevation, disclosing a light mechanism for night fishing as applied to a fishing rod, and Figure 3 is a sectional view taken substantially along the line 3—3 of Figure 2, as viewed in the direction indicated by the arrows.

Similar reference characters refer to similar parts throughout the several views of the drawings.

Having reference now to the drawing in detail, there is generally indicated at 10 a fishing pole of any desired conventional type, including a handle 11, and a reel 12, the latter being adapted to retain a line 13, which extends forwardly through loops 14 to the end of the pole.

The device of the instant invention comprises a casing 15 having a threaded end closure 16, and includes at its opposite end a bushing 17 having an interiorly threaded aperture 18 in which is seated a bulb 19 having a plug 20, the plug 20 being provided with a contact 21, adapted to engage an opposed contact 22, carried by a battery 23.

The end of casing 15 containing bulb 19 is provided also with a lens cap 24 containing a lens 25.

The device is adapted to be affixed to fishing rod 10 as by means of a double clip generally indicated at 30, including a double pair of arms 31, having outwardly flared extremities 32 adapted to encompass the casing 15 and a second pair of arms 33 also having outwardly flared extremities 34 adapted to encircle the fishing rod or pole 10.

The switch mechanism for the device comprises a threaded stem 35 centrally apertured to accommodate a slidable rod 36. The stem 35 sits in a lock nut 37 which surmounts a washer 38, and extends into threaded engagement with a suitably threaded aperture preferably in the top of casing 15, the said top being a relative term in accordance with the position of the clip 30.

Stem 36 terminates in a U-shaped bifurcated member 40 having a generally arcuate configuration as best shown in Figure 3, adapted for the reception of line 13. Threaded member 35 also accommodates a lock nut 41 between which nut and the base 42 of bifurcated member 40 is positioned a compression spring 43. The nut 41 may be readily adjusted to vary the tension of spring 43 in order to accommodate various pressure conditions, such as wind pressure, the strength of the tide, or the like.

From the foregoing, the operation of the device should now be readily understandable. The line 13 extends from reel 12, over bifurcated member 40 and through loops 14, to the end of pole 10. Obviously, any excess pressure exerted on the line 13 as, for example, by the bite of a fish, will cause tension on line 13 to bias rod 36 downwardly, which in turn will cause a plate 50 at the lower extremity of rod 36 and interiorly of the casing 15, to engage the socket 20 of bulb 19, thus closing a circuit through battery 23 and casing 15 to illuminate the bulb 19, thus indicating a bite on a line.

While the device hereinbefore shown and described has been illustrated as a switch to be employed in conjunction with a visual signal, it is to be understood that an audible signal, such as bell or a buzzer, may be alternatively employed for daytime uses.

From the foregoing, it will now be seen there is herein provided an improved fishing signal or indicator, which accomplishes all of the objects of this invention, and others, including many advantages of great practical utility and commercial importance.

As many embodiments may be made of this inventive concept, and as many modifications may be made in the embodiment hereinbefore shown and set forth, it is to be understood that all matter herein is to be interpreted merely as illustrative and not in a limiting sense.

I claim:

In a signal indicator device for ready attachment to and detachment from a fishing pole having a fishing line extending from a reel through loop thereon, the indicator device having a tubular battery casing, a double ended U-clip engaging said casing at one end and the fishing rod at the other end and a signal member mounted in one end of said battery casing normally in contact with a battery in said casing, a readily adjustable switch for completing the circuit through said signal member and battery to ground comprising a threaded tubular member extending through one side of said battery casing adjacent said signal member end of said casing, a first nut threaded on said threaded tubular member locking said tubular member to said casing, a movable contact rod slidable inside said threaded member having at its inner end within said casing a contact plate for completing the circuit to said signal member, a U-shaped bifurcated member surmounted on the outer extremity of said slidable contact rod for engagement by the fishing line between the reel and the loops, a second nut threaded on said threaded tubular member and a compression spring about said threaded tubular member biased between said second nut and said U-shaped bifurcated member for adjusting the fishing line tension necessary to actuate said signal, said U-shaped bifurcated member permitting unobstructed movement of said fishing line between or away from its bifurcations.

References Cited in the file of this patent

UNITED STATES PATENTS

| Number | Name | Date |
|---|---|---|
| 368,809 | Carter | Aug. 23, 1887 |
| 1,226,607 | Gillen | May 15, 1917 |
| 1,267,248 | Monighan | May 21, 1918 |
| 1,307,456 | Prahar | June 24, 1919 |
| 2,179,878 | Dietrich | Nov. 14, 1939 |
| 2,195,692 | Bushey | Apr. 2, 1940 |
| 2,619,559 | Schenkel | Nov. 25, 1952 |

FOREIGN PATENTS

| Number | Country | Date |
|---|---|---|
| 12,630 | Great Britain | 1908 |
| 691,184 | Great Britain | May 6, 1953 |